Dec. 10, 1963  J. H. BERTIN  3,113,764
HEAT EXCHANGE IN A FURNACE
Filed July 21, 1959
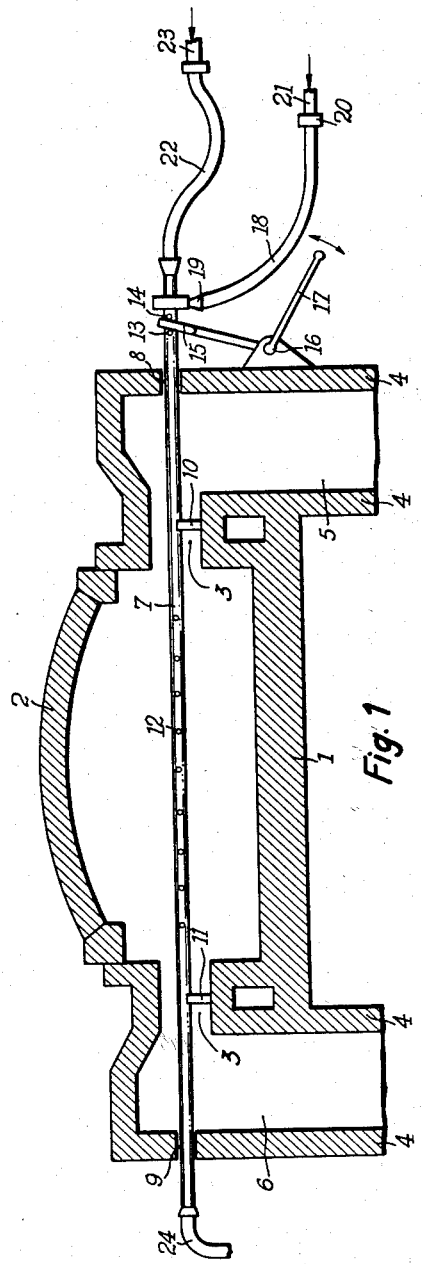
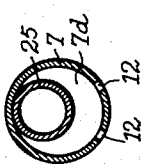
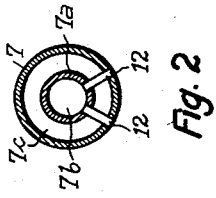

United States Patent Office 3,113,764
Patented Dec. 10, 1963

3,113,764
HEAT EXCHANGE IN A FURNACE
Jean Henri Bertin, Neuilly-sur-Seine, France, assignor to Societe Bertin & Cie, Paris, France, a French company
Filed July 21, 1959, Ser. No. 828,576
Claims priority, application France July 24, 1958
1 Claim. (Cl. 263—10)

It is known to improve heat exchange or combustion or convection conditions in an enclosed space by auxiliary blowing of jets which extend transversely of the general flow in the space.

There are a number of problems connected with the use of such jets in melting or treatment furnaces such as are used in metallurgy. It is difficult or not very practicable to pierce the furnace arch or walls with the many apertures required for the jet injection nozzles, for the walls are made of a refractory substance, are thick and fragile, more particularly in the arch or ceiling area, and above all it is difficult to provide sealing-tightness in connection with apertures in walls subjected to the highest temperature in the furnace.

According to the invention, to obviate these disadvantages an apparatus is provided wherein the auxiliary blowing jets are provided by one or more collectors within the furnace, such collector or collectors extending through the furnace wall preferably in the cool parts thereof.

According to one feature of the invention, the collector or collectors, which can with advantage be cooled by appropriate means, can be so moved within the furnace that the blowing jets can be directed towards the areas where a change is required in local circulation or combustion or heat exchange conditions.

The following description, taken in conjunction with the accompanying drawings given by way of non-limitative example, will make clearly apparent the various features of the invention and the manner of carrying them into effect: any step arising out of the description or of the drawings forms, of course, part of this invention.

FIG. 1 is a diagrammatic longitudinal sectional view of part of a furnace having an apparatus according to the invention, FIG. 2 is an auxiliary fluid collector tube in cross-section, and FIG. 3 is a variant of FIG. 2.

Referring to the drawings, an illustration is given in longitudinal section of part of a furnace which can be, for instance, a heat treatment furnace comprising a hearth 1, arch 2, pipes or tubes for the hot gases, and side walls 4 containing ducts 5, 6 communicating with the furnace interior at 3 the level of the hot gas pipes or tubes. The duct 5 is an air intake duct and the duct 6 is a removal duct.

According to the invention, tubes 7 supplied with auxiliary fluid are provided within the furnace. The tubes 7, which are parallel to one another and preferably spaced apart evenly from one another, are disposed in the same horizontal or slightly inclined plane and extend through apertures 8, 9 in the end walls of the ducts 5, 6—i.e. in the coolest walls of the furnace. To ensure that the tubes 7 do not bend in long furnaces, the tubes 7 are supported by refractory supports 10, 11 disposed in the space 3 at the level of the hot gas pipes or tubes. Each tube 7 is pierced with one or more series of apertures 12 which are evenly spaced apart from one another lengthwise, a jet of auxiliary fluid issuing from each aperture 12 perpendicularly to the tube.

The tubes 7 are slidable through the apertures 8, 9. Consequently the tubes 7 have at one end two lateral teats 13, 14 which are offset from one another lengthwise and between which is placed a stirrup 15 forming one of the arms of a lever pivoting around a stationary spindle 16. The other arm 17 of the lever is substantially perpendicular to the stirrup 15 and is an operating arm. Also, the tubes 7 can pivot around their own axes.

By moving the tubes 7, therefore, the auxiliary blowing jets can be operated in the required part of the furnace, for instance, on a solid charge which has to be melted; alternatively the jets can be operated at either end of a Siemens reversing furnace in which the movement of the air and hot gases is reversed at regular intervals, the duct 5 being used alternately as an air intake duct and as a removal duct.

Each tube 7 is supplied with auxiliary fluid by way of a flexible pipe 18 connected at one end 19 to the tube 17 and at the other end 20 to a stationary duct 21. The auxiliary fluid can be fuel or combustion support or a mixture thereof if it is required more particularly to improve heat exchange or convection conditions. It can be loaded with coal particles or have a very high combined carbon content if it is required to improve flame radiation.

To prevent overheating of the tubes 7 a cooling fluid flows therethrough. In the embodiment illustrated in FIG. 2 the tubes 7 are double-walled and comprise an outer wall in the form of a tube 7 and an inner wall in the form of a tube 7a of reduced diameter. These tubes form between themselves an annular space 7d and the inner tube wall 7a defines an interior space 7b. The auxiliary fluid supplying the jets issuing from the apertures 12 flows in the innermost area 7b, while the cooling fluid, possibly water or compressed air or low-pressure steam, flows in the annular area 7c. The cooling fluid is supplied to one end of the tube through a flexible pipe 22 connected to a stationary pipe 23 and is delivered at the other end of the tube 7 to a flexible pipe 24 connected to a stationary pipe (not shown), so that the fluid can be recycled after cooling. Alternatively an excess of the auxiliary fluid supplying the jets through the apertures 12 could flow through the tube 7 and be recycled after cooling outside the furnace.

In a variant each injection tube 7, which is preferably made of a thin refractory metal or of a refractory ceramic, is internally supported by a tube 25 (FIG. 3). The cooling fluid, such as water or air or steam, supplied through the duct 22 flows inside the tube 25 and cools said injector tube 7, mainly by radiation through the auxiliary fluid flowing in the spaced 7d between the outer surface of the tube 25 and the inner surface of the tube 27.

The transverse jets of auxiliary fluid issuing from the tubes inside the furnace according to the invention help to accelerate and improve combustion by increasing turbulence and thereby increasing the probability of contact between the various molecules associated with the reaction.

Also, the jets increase the coefficient of exchange between the gases and the molten or treatment substance by increasing convection rates and obviating slowed-down boundary layers.

Transverse jets issuing from tubes which can be moved lengthwise or which can pivot around themselves make it possible to direct the combustion gases or smoke by induction towards a particular place or area in the furnace.

The movements of the tubes can be oscillations of a frequency adapted to widen the area of operation of each jet while rendering the operation thereof uniform in a large volume, so that more intense jets separated further apart from one another can be used.

The embodiments hereinbefore described can, of course be modified, more particularly by the substitution of equivalent technical means, without any departure from the scope of the invention. For instance, the tube or tubes 7 can be disposed lengthwise or transversely of the furnace and, instead of being borne on refractory supports, as 10, 11, could be suspended from the arch at one or more places, each suspension rod being cooled and, if required, also receiving the auxiliary blowing gases.

What is claimed is:

In a furnace having a hearth adapted to receive the material to be treated at a predetermined level, and an arch and side walls defining the furnace interior, the combination of auxiliary blowing apparatus comprising at least one hollow auxiliary tube and a hollow collector tube surrounded by said hollow auxiliary tube and supported interiorly by the same, whereby an outer space is formed between said two tubes, both tubes passing through said side walls and extending through said furnace interior substantially parallel to said hearth and adapted to be close to said level, said collector tube having at least one series of apertures providing communication between said outer space and the furnace interior, whereby auxiliary blowing jets issuing from said apertures improve the thermal exchange in said furnace, and means for introducing a cooling medium in said hollow auxiliary tube for cooling said collector tube.

References Cited in the file of this patent

UNITED STATES PATENTS

| | | |
|---|---|---|
| 122,380 | Hamilton et al. | Jan. 2, 1872 |
| 936,758 | Carr et al. | Oct. 12, 1909 |
| 1,185,205 | Kemp et al. | May 30, 1916 |
| 1,243,798 | Beaver et al. | Oct. 23, 1917 |
| 1,315,719 | Grindle | Sept. 9, 1919 |
| 1,498,875 | Howard | June 24, 1924 |
| 2,011,498 | Miller | Aug. 13, 1935 |
| 2,342,120 | Cartwright | Feb. 22, 1944 |
| 2,474,701 | Slottman | June 28, 1949 |
| 2,675,864 | Seaver | Apr. 20, 1954 |
| 2,744,477 | Hartley et al. | May 8, 1956 |

FOREIGN PATENTS

| | | |
|---|---|---|
| 2,235 | Great Britain | 1907 |